United States Patent
Karafillis et al.

[11] Patent Number: 5,949,163
[45] Date of Patent: Sep. 7, 1999

[54] REINFORCED MOTOR HAVING REDUCED OPERATIONAL VIBRATION AMPLITUDE

[75] Inventors: Apostolos Pavlos Karafillis, Cambridge, Mass.; Robert Arvin Hedeen, Clifton Park, N.Y.

[73] Assignee: General Electric Company, Schenectady, N.Y.

[21] Appl. No.: 09/178,757

[22] Filed: Oct. 26, 1998

[51] Int. Cl.⁶ .................................................. H02K 5/24
[52] U.S. Cl. ............................................................ 310/51
[58] Field of Search ................... 310/51, 89, 42; 220/4.06, 4.07; 174/66

[56] References Cited

U.S. PATENT DOCUMENTS

| | | | |
|---|---|---|---|
| 3,887,826 | 6/1975 | Apostoleris | 310/43 |
| 4,186,319 | 1/1980 | Dochterman | 310/89 |
| 4,631,433 | 12/1986 | Stokes | 310/89 |
| 4,801,833 | 1/1989 | Dye | 310/239 |
| 5,327,036 | 7/1994 | Carey | 310/89 |
| 5,475,275 | 12/1995 | Dohogne et al. | 310/89 |
| 5,610,461 | 3/1997 | Dohogne et al. | 310/89 |
| 5,806,169 | 9/1998 | Trago et al. | 29/596 |

*Primary Examiner*—Nestor Ramirez
*Assistant Examiner*—Joseph Waks
*Attorney, Agent, or Firm*—Marvin Snyder; Douglas E. Stoner

[57] ABSTRACT

A reinforced motor for reducing amplitude of operational vibrations includes a stator having an open end, a rotor disposed through and centrally of the stator and having at least one end, an end shield mounted to the open end of the stator and having an outer surface and rotatably supporting the rotor at the one end thereof, and an elongated stiffening member attached to or formed on the outer surface of the end shield so as to increase stiffness and reduce bending of the end shield and thereby reduce amplitude of operational vibrations produced by rotation of the rotor relative to the stator. A peripheral portion of the end shield forms an opening for receiving a switch housing. The stiffening member is attached on the outer surface of the end shield adjacent to the switch housing opening.

2 Claims, 2 Drawing Sheets

REINFORCED MOTOR HAVING REDUCED OPERATIONAL VIBRATION AMPLITUDE

BACKGROUND OF THE INVENTION

The present invention generally relates to motors and, more particularly, to a reinforced motor for reducing the amplitude of operational vibrations.

Vibrations can develop on motors, such as the Form W electric motor manufactured and sold by General Electric Company, at a variety of different frequency levels for any number of different reasons. If the amplitude of the vibrations is higher than an acceptable threshold value prescribed by a manufacturer and/or a customer, the motor will not pass a quality inspection at the manufacturer site and/or the customer site. Also, a motor which has passed a quality inspection may develop vibration problems in the field after assembly into an electric appliance or because of small changes in the structure of the motor assembly developed during operational service as part of an appliance. A high amplitude vibration of the motor is undesirable, as it creates vibration and noise problems on the appliance powered by the motor.

With respect to the Form W motor, vibrations at frequencies which are multiples of twice line frequency, 120 Hz, and in particular 360 Hz and 480 Hz, are a result of asymmetric electromagnetic forces developed between the stator and rotor of the motor. Vibrations at the 360–480 Hz frequency level occur as a direct result of excitation electromagnetic forces at the same frequency level. The excitation electromagnetic forces are internal forces for the Form W motor. The structural components of the Form W motor that join the stator and rotor are called end shields. Each Form W motor has upper and lower end shields attached at opposite ends of the stator. The end shields rotatably support the rotor centrally of the stator. The end shields are compliant components made of lightweight sheet metal which can deform due to asymmetric electromagnetic forces, thereby allowing vibrations of high amplitude at the 360–480 Hz frequency level. The most compliant end shield of the two end shields of the Form W motor is the one end shield with a switch opening, referred to as the open end shield. Experiments and Finite Element Analysis of end shields have shown that the open end shield deforms when vibrating at 360 Hz on the Form W motor. The open end shield, particularly, develops high levels of bending deformation above the switch opening when loaded radially in a direction parallel to the plane of the side wall of the enclosure with the switch opening.

Consequently, a need exists for a structural modification of the motor that will reduce or substantially eliminate the aforementioned vibration and noise problems generated by the motor without introducing any new problems in place thereof.

BRIEF SUMMARY OF THE INVENTION

The present invention provides a structural reinforcing or stiffening member on the motor which is designed to satisfy the aforementioned need. The reinforced motor of the present invention includes one or more stiffening members which substantially reduce the amount of vibration and/or noise transmitted from the rotor to the end shields of the motor. The stiffening member is attached to or formed on an end shield mounted on the stator. The stiffening member is particularly effective if mounted to an open end shield which defines an opening for a switch housing. The stiffening member has been measured to reduce the amplitude of vibrations by more than 30% on the open end shield of the motor.

In one embodiment of the present invention, a reinforced motor for reducing amplitude of operational vibration is provided which comprises a stator having an open end, a rotor disposed through the stator and having at least one end, an end shield mounted to the open end of the stator and having an outer surface and rotatably supporting the rotor at the one end thereof, and an elongated stiffening member attached to the outer surface of the end shield so as to increase stiffness and reduce bending of the end shield and thereby reduce amplitude of operational vibrations produced by rotation of the rotor relative to the stator. The stiffening member has a generally rectangular configuration in transverse cross-section and a longitudinal length greater than the transverse width thereof. In this embodiment, the stiffening member is comprised of a material having greater rigidity and stiffness than the material comprising the end shield so as to provide a reinforcement of the end shield that increases the stiffness and reduces the bending of the end shield. In the alternative, the stiffening member may be formed directly into the material of the end shield is such a way as to inhibit twisting of the end shield in that area.

In one construction, a portion of the end shield forms an opening for a switch housing. The stiffening member is attached on the outer surface of the end shield adjacent to the switch housing opening but alternatively may be formed in the end shield as an integral part thereof. Further, the end shield has a plurality of raised surface portions formed on and protruding outwardly from the outer surface thereof and spaced apart from one another. The stiffening member is mounted to or formed on the outer surface of the end shield and extends between a pair of adjacent ones of the raised surface portions of the end shield which are adjacent to opposite ends of the switch housing opening. The opposite ends of the stiffening member are disposed adjacent to the raised surface portions of the end shield at the opposite ends of the switch housing opening.

The reinforced motor may further comprise a plurality of the stiffening members mounted to or formed on the outer surface of the end shield. Each of the stiffening members extends between and is mounted at its opposite ends to adjacent ones of the raised surface portions of the end shield.

DETAILED DESCRIPTION OF THE INVENTION

Figure 1:
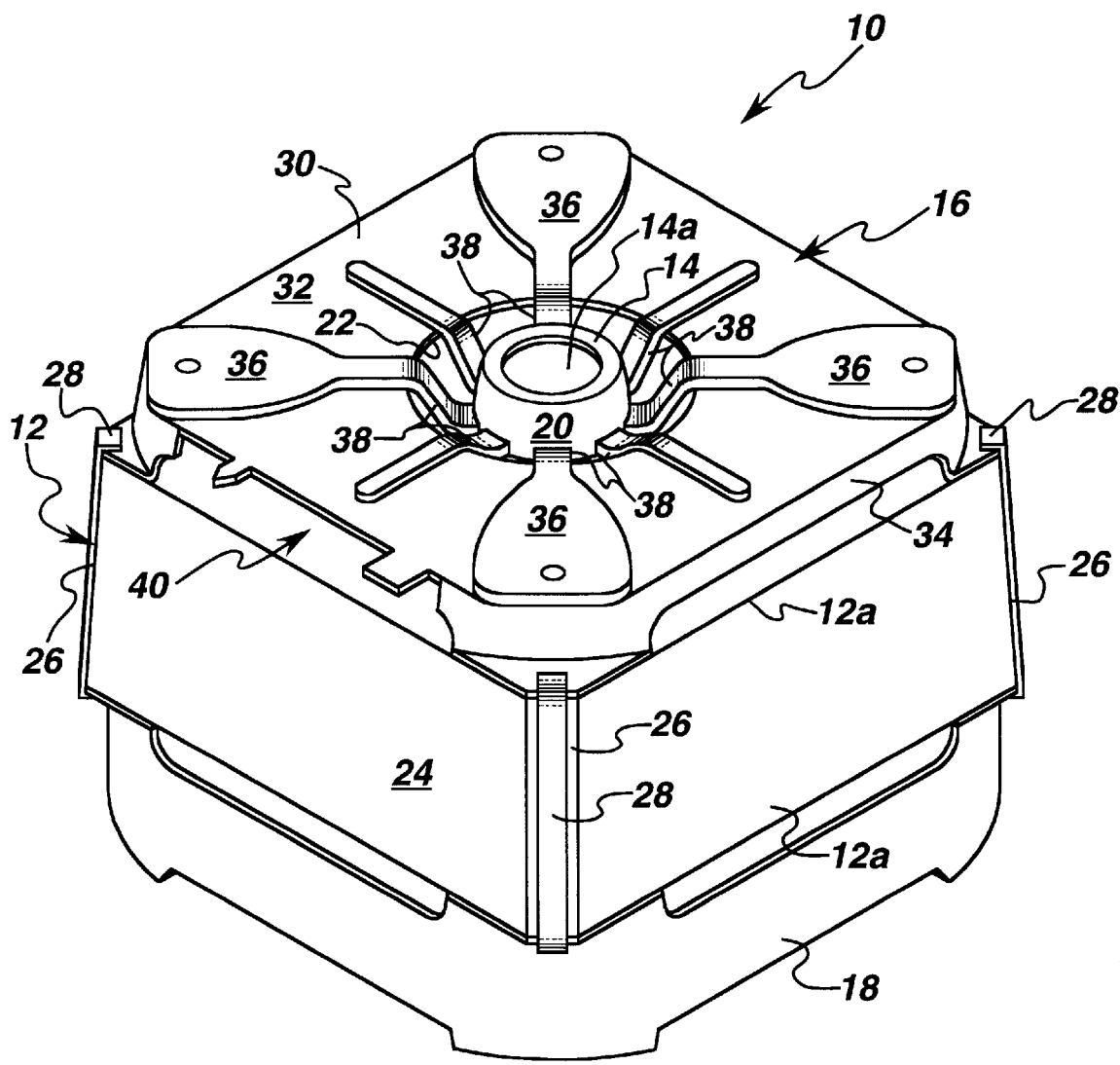
FIG. 1 is a perspective view of a prior art motor.

Referring to the drawings and particularly to FIG. 1, there is illustrated a prior art motor, generally designated 10, particularly being a Form W motor manufactured and sold by General Electric Company. Basically, the prior art motor 10 includes an annular stator 12, a rotor 14 disposed through the stator 12 and opposite top and bottom end shields 16, 18. Alternatively, the motor 10 may have a housing (not shown) enclosing the stator 12. The stator 12 has opposite upper and lower open ends 12a (only the upper open end 12a being seen in FIG. 1). The opposite end shields 16, 18 are spaced from and mounted to the opposite open ends 12a of the stator and rotatably support the rotor 14 through the stator 12 via opposite rotor bearing hubs 20 (only the top bearing hub 20 being seen in FIG. 1) supported within a central opening 22 formed in each of the end shields 16, 18. The rotor bearing hubs 20 rotatably support the rotor 14 at respective opposite ends 14a thereof centrally within the stator 12.

The stator 12 of the prior art motor 10 has four interconnected side walls 24 defining the opposite upper and lower open ends 12a of the stator 12. The stator 12 has a substantially rectangular configuration and four corners 26. The prior art motor 10 also includes four clamps 28. Each clamp 28 has a substantially C-shaped configuration and is disposed at one of the four corners 268 of the stator 12 and secures the respective top and bottom end shields 16, 18 to the opposite open ends 12a of the stator 12.

In addition to the central opening 22, the top end shield 16 has a relatively flat top wall 30 with an outer surface 32, a downwardly extending peripheral portion 34 surrounding and attached to the top periphery of the top wall 30 and a plurality of raised surface portions or embossments 36 formed on the top wall 30 and protruding outwardly from the outer surface 32 thereof. The raised surface portions 36 are spaced apart from one another and generally located adjacent to the respective corners 26 of the stator 12. Compared to the relatively rigid stator 12, the top and bottom end shields 16, 18 are made of relatively lightweight sheet metal and thus the top end shield 16 especially is susceptible to bending and vibration during normal operational rotation of the rotor 14 relative to the stator 12. The prior art motor 10 also includes a plurality of legs 38 which are formed or attached on the top wall 30 of the top end shield 16. The legs 38 which are spaced apart from one another in a circumferential direction about the upper rotor bearing hub 20 extend radially inwardly across the central opening 22 in the top end shield 16 and attach to and support the rotor bearing hub 20 within the central opening 22.

The peripheral portion 34 of the top end shield 16 has an opening 40 for a switch housing (not shown) formed therein. The switch housing opening 40 extends between a pair of adjacent ones of the four corners 26 of the stator 12 and a pair of adjacent ones of the four raised surface portions 36 of the top end shield 16.

Figure 2:
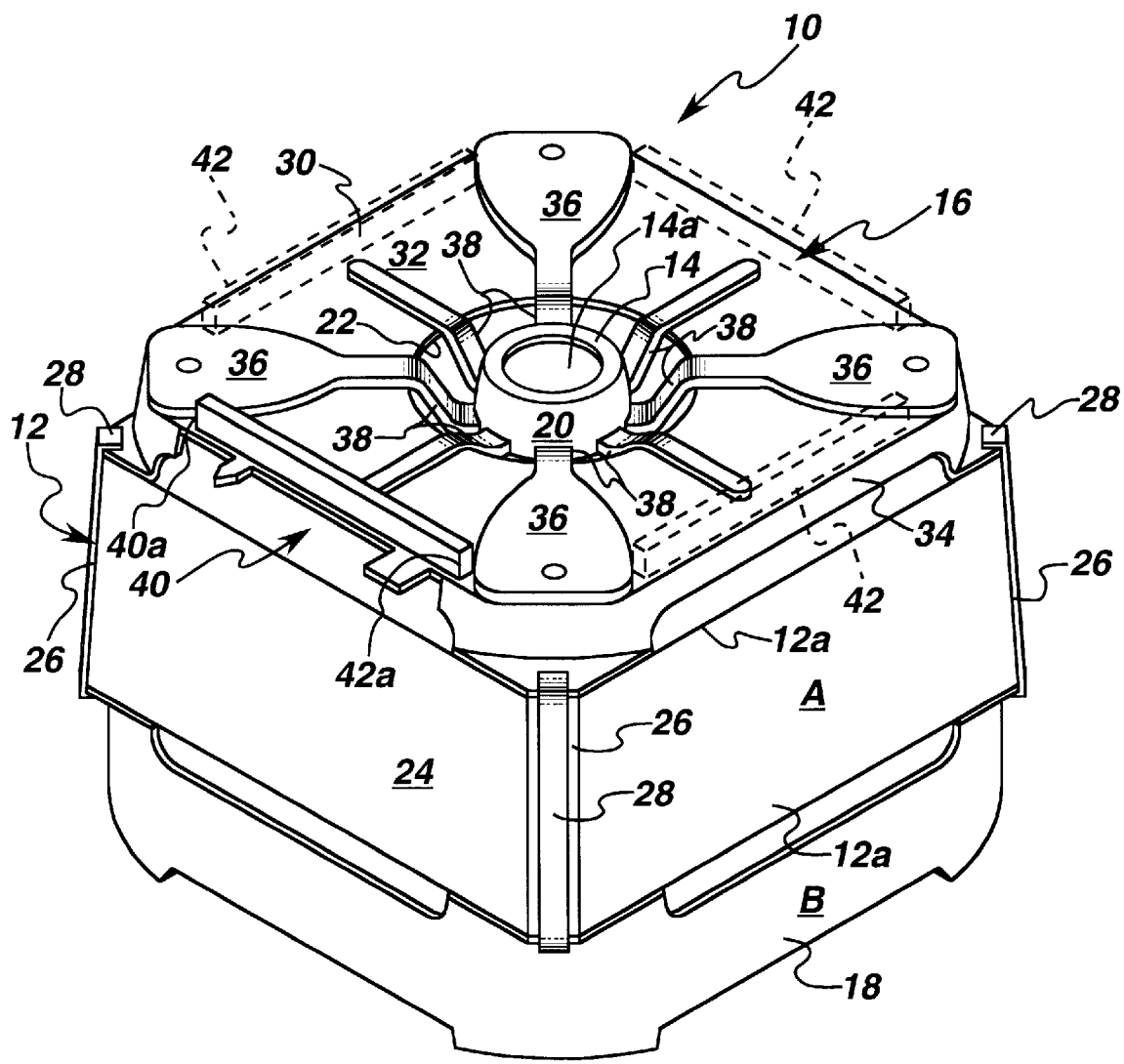
FIG. 2 is a perspective view of one embodiment of a reinforced motor of the present invention.

Referring now to FIG. 2, there is illustrated a reinforced motor, generally designated 10a, of the present invention which includes one or more elongated stiffening members 42 discrete from and attached to, or monolithic with and formed on, the outer surface 32 of the top end shield 16 providing the desired reinforcement of the motor 10a. The reinforced motor 10a is otherwise the same as the prior art motor 10, including each of the components thereof described above and being identified by the same reference numerals. The stiffening member 42 is mounted outwardly from and on the outer surface 32 of the top wall 30 of the top end shield 16. The stiffening member 42 can be rigidly joined (to transmit the vibration-induced stresses without slip or debonding between the stiffening member 42 and the outer surface 32) on the top wall 30 of the top end shield 16 in any suitable conventional manner, such as by the use of a suitable commercial epoxy adhesive or the like.

The stiffening member 42 can have a substantially rectangular configuration in transverse cross-section and has a longitudinal length L substantially greater than its transverse width W. The stiffening member 42 is comprised of a material having greater rigidity and stiffness than the material comprising the top end shield 16 so as to provide a reinforcement of the top end shield 16 that increases the stiffness and reduces the bending thereof and thereby reduces the amplitude of operational vibrations produced by rotation of the rotor 14 relative to the stator 12. Alternatively, the stiffening member 42 may be formed directly into the material of the top end shield 16 in such a way as to inhibit twisting of the end shield 16 in that area so as to provide a reinforcement of the top end shield 16 to thereby increase the stiffness and reduce the bending thereof and thereby reduce the amplitude of operational vibrations produced by rotation of the rotor 14 relative to the stator 12.

The stiffening member 42 has opposite ends 42a, 42b. The stiffening member 42 preferably extends between and is mounted at its opposite ends 42a, 42b to a pair of adjacent ones of the raised surface portions 36 of the top wall 30 of the top end shield 16. The stiffening member 42 is disposed adjacent to the switch housing opening 40. More than one of the stiffening members 42 may be used, as shown in FIG. 2, although only one appears to be sufficient to reduce the amplitude of the operational vibrations. Each stiffening member 42 of the plurality thereof would extend between different adjacent pairs of the raised surface portions 36 of the top end shield 16 of the reinforced motor 10a.

Experimental and analytical work was conducted and the amplitude of vibrations produced at 360 Hz operation of the reinforced motor 10a was measured at points A and B on the reinforced motor 10a. The amplitude of vibrations at point A dropped 32% from 1.37 g to 0.93 g and at point B dropped 46% from 2.40 g to 1.30 g upon mounting of the stiffening member 42 to the top end shield 16 of the reinforced motor 10a.

It is thought that the present invention and its advantages will be understood from the foregoing description and it will be apparent that various changes may be made thereto without departing from its spirit and scope of the invention or sacrificing all of its material advantages, the form hereinbefore described being merely an embodiment thereof.

What is claimed is:

1. A reinforced motor for reducing amplitude of operational vibrations, comprising:

a stator having an open end;

a rotor disposed through said stator and having at least one end;

an end shield mounted to said open end of said stator and having an outer surface, said end shield rotatable supporting said rotor at said one end thereof; and an elongated stiffening member attached to or formed on said outer surface of said end shield so as to increase stiffness and reduce bending of said end shield and thereby reduce an amplitude of operational vibrations produced by rotation of said rotor relative to said stator;

wherein said stiffening member is attached to said end shield, and wherein said stiffening member is comprised of a material having greater rigidity and stiffness than a material comprising said end shield so as to provide a reinforcement of said end shield.

2. A reinforced motor for reducing amplitude of operational vibrations, comprising:

a annular stator having an open end;

a rotor disposed centrally through said annular stator and having at least one end;

an end shield mounted to said open end of said stator and having an outer surface, a central opening receiving said one end of said rotor and a plurality of raised surface portions formed on and protruding outwardly from said outer surface and spaced apart from one another, said end shield rotatably supporting said one end of said rotor within said central opening; and an elongated stiffening member attached to or formed on said outer surface of said end shield and extending between a pair of adjacent ones of said raised surface portions of said end shield so as to increase stiffness and reduce bending of said end shield and thereby reduce an amplitude of operational vibrations produced by rotation of said rotor relative to said stator;

wherein said stiffening member is attached to said end shield, and wherein said stiffening member is comprised of a material having greater rigidity and stiffness than a material comprising said end shield so as to provide a reinforcement of said end shield.

* * * * *